Feb. 10, 1948.  E. S. HINELINE  2,435,835
CURTAIN SLOT ADJUSTING MEANS TO CONTROL THE
EXPOSURE TIME OF CAMERA SHUTTERS
Original Filed March 24, 1944    5 Sheets-Sheet 1
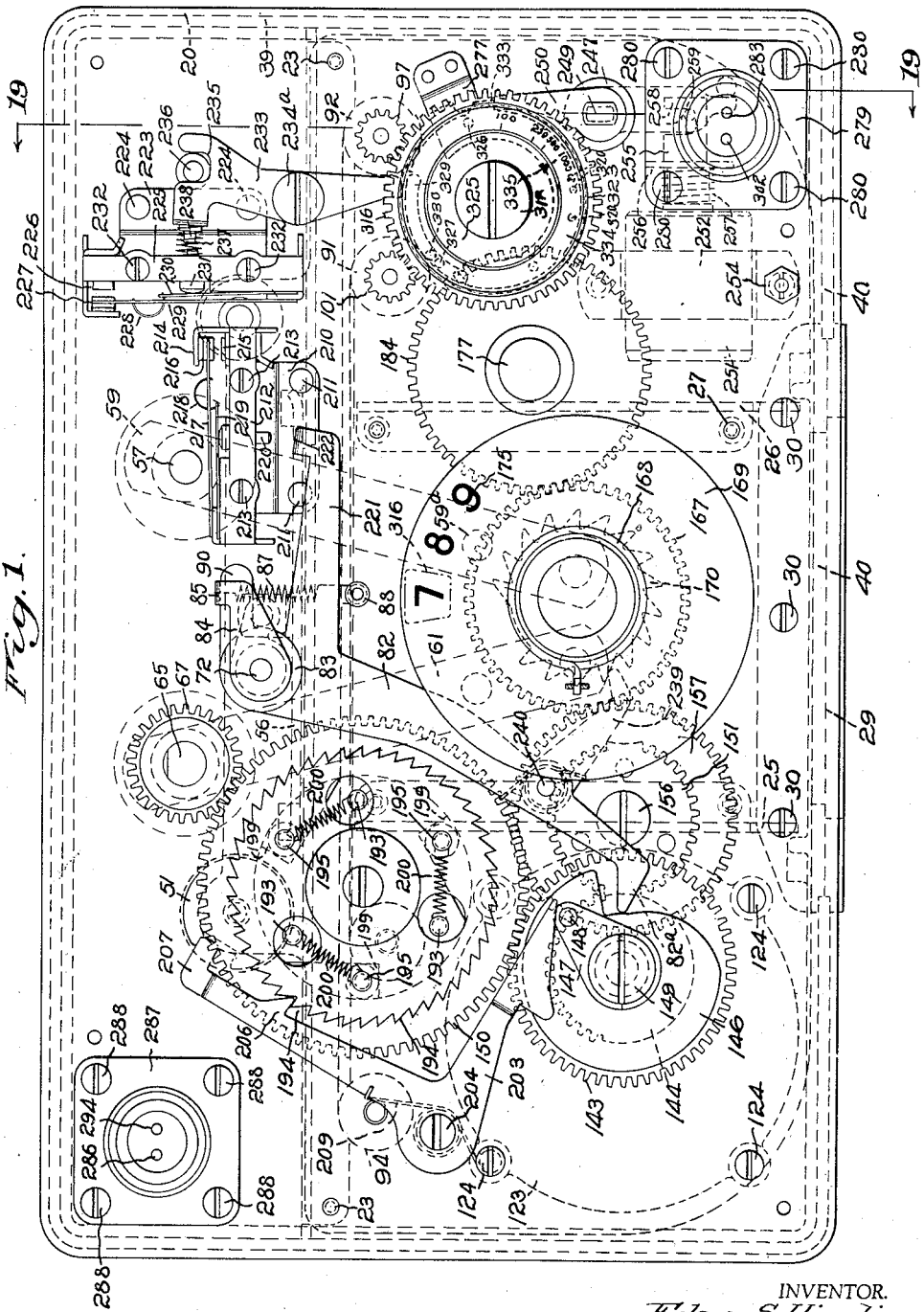
INVENTOR.
Edson S. Hineline
BY
his Attorneys

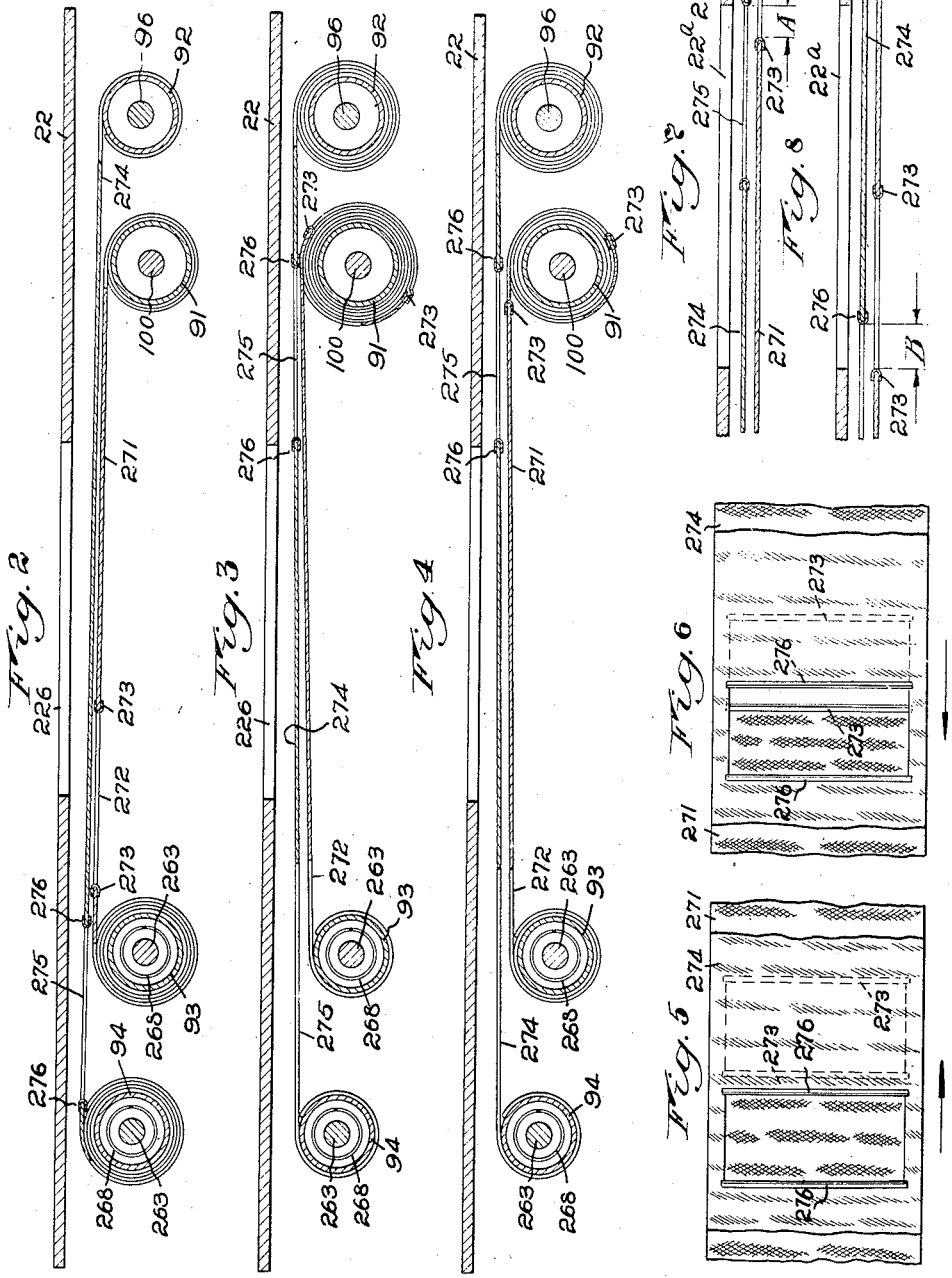

Feb. 10, 1948.  E. S. HINELINE  2,435,835
CURTAIN SLOT ADJUSTING MEANS TO CONTROL THE
EXPOSURE TIME OF CAMERA SHUTTERS
Original Filed March 24, 1944   5 Sheets-Sheet 3
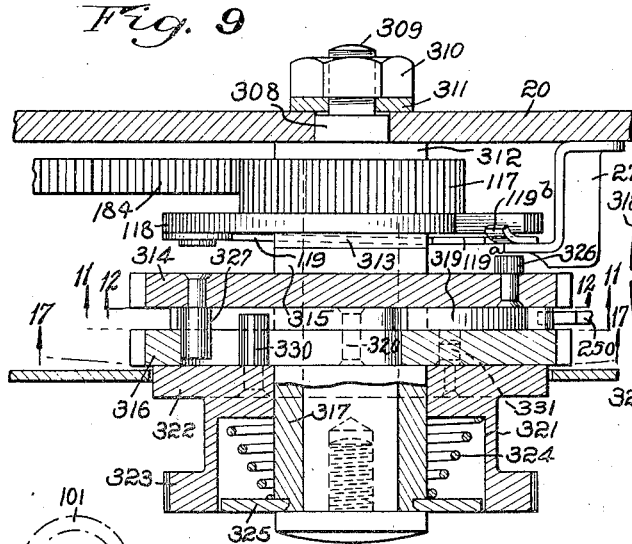
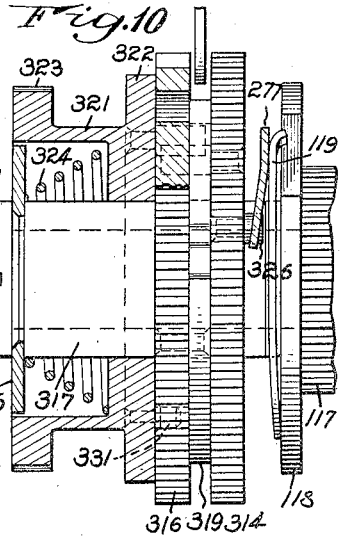
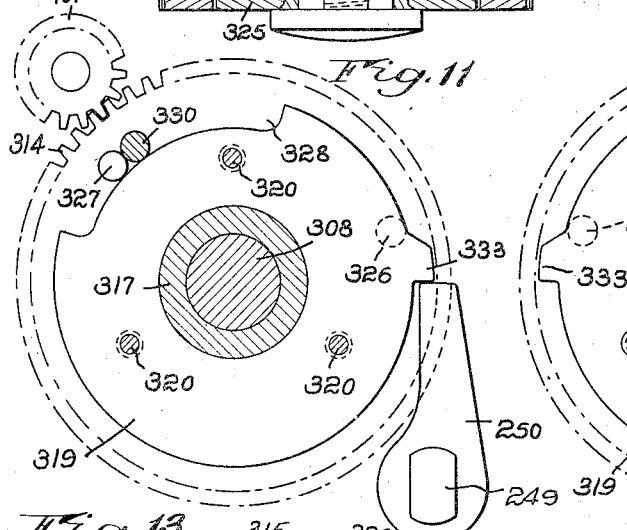
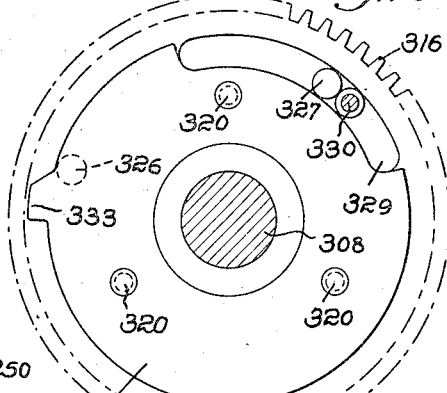
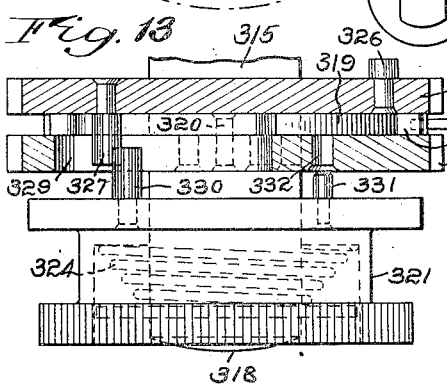
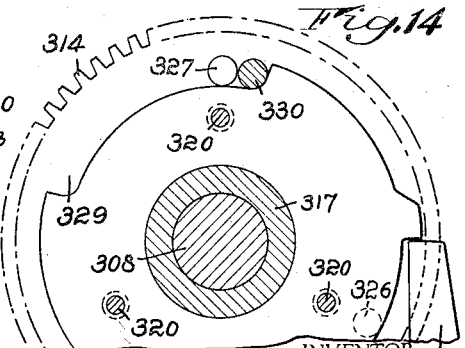
INVENTOR
Edson S. Hineline
BY
his Attorneys Feb. 10, 1948.  E. S. HINELINE  2,435,835
CURTAIN SLOT ADJUSTING MEANS TO CONTROL THE
EXPOSURE TIME OF CAMERA SHUTTERS
Original Filed March 24, 1944  5 Sheets-Sheet 4
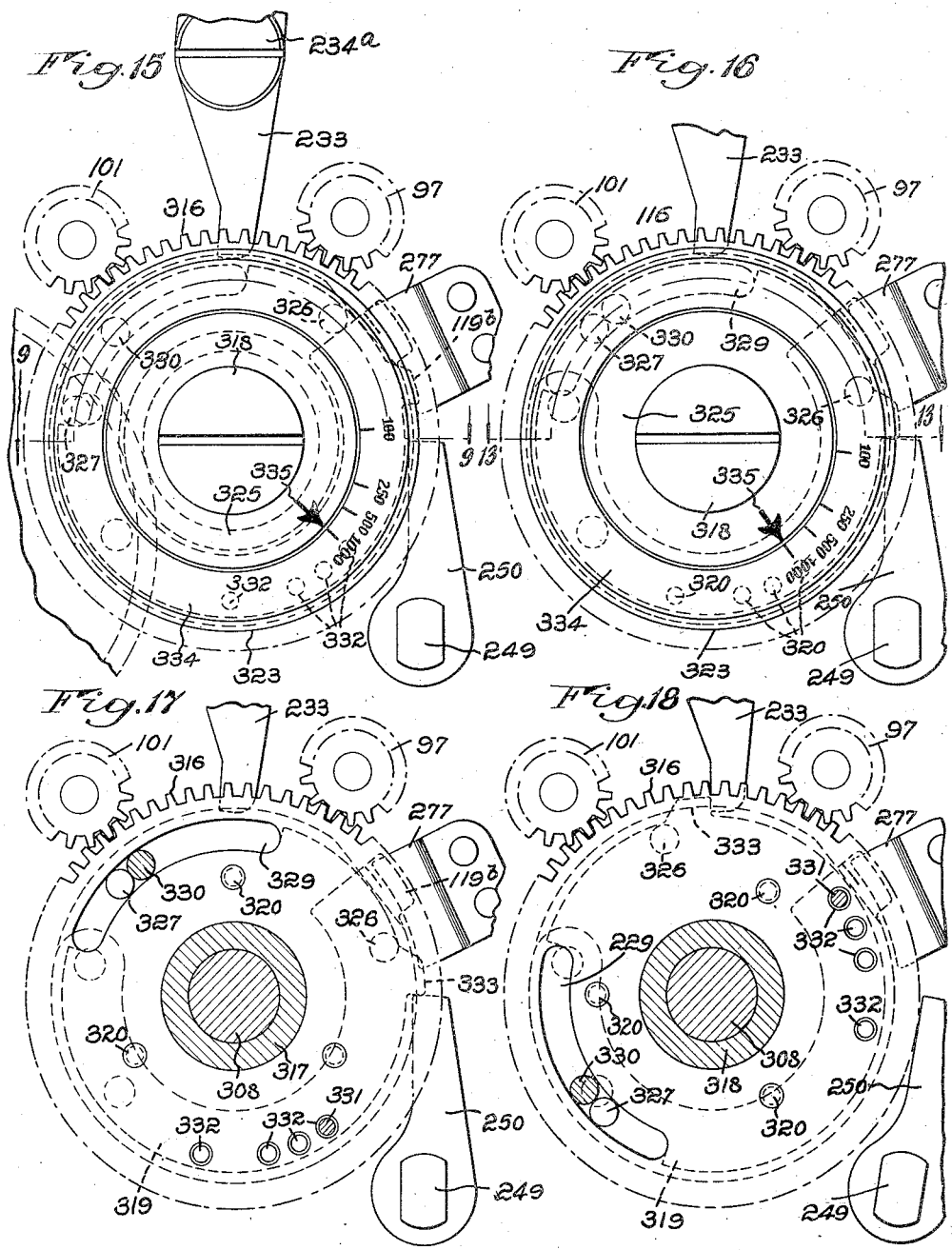
INVENTOR.
Edson S. Hineline
BY
Emery, Booth, Townsend, Miller and Learner
his Attorneys Feb. 10, 1948. E. S. HINELINE 2,435,835
CURTAIN SLOT ADJUSTING MEANS TO CONTROL THE
EXPOSURE TIME OF CAMERA SHUTTERS
Original Filed March 24, 1944 5 Sheets-Sheet 5
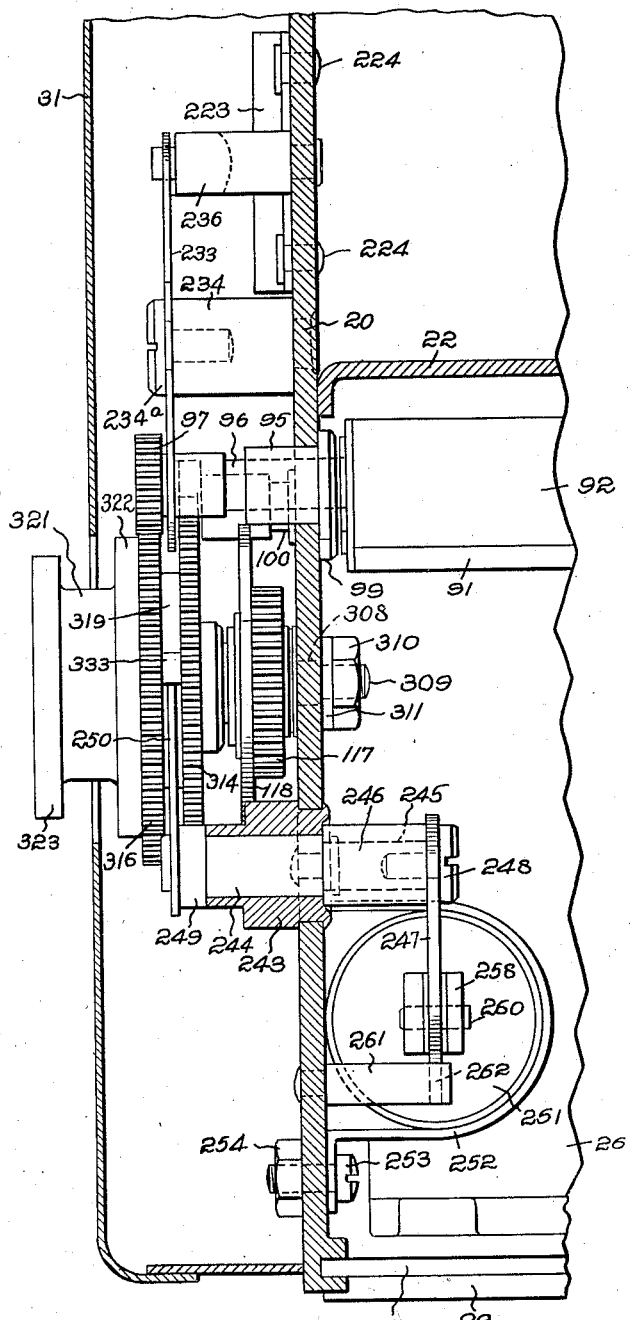

Patented Feb. 10, 1948

2,435,835

UNITED STATES PATENT OFFICE 2,435,835

CURTAIN SLOT ADJUSTING MEANS TO CONTROL THE EXPOSURE TIME OF CAMERA SHUTTERS

Edson S. Hineline, Rochester, N. Y., assignor to Graflex, Inc., Rochester, N. Y., a corporation of Delaware Application March 24, 1944, Serial No. 527,918, which is a division of application Serial No. 506,848, October 19, 1943. Divided and this application June 6, 1945, Serial No. 597,864

20 Claims. (Cl. 95—57)

This application is a division of my co-pending application Ser. No. 527,918, filed March 24, 1944, now Patent No. 2,407,277, dated September 10, 1946, which is itself a division of my co-pending application Ser. No. 506,848, filed October 19, 1943, now Patent No. 2,393,534, dated January 22, 1946, for Electric-motor-driven combined camera, focal-plane shutter, and film-feed.

This invention relates to curtain slot adjusting means to control the exposure time of a camera shutter to be used in various types of cameras, but particularly in automatic aerial cameras.

In order that the principal of the invention may be readily understood, I have disclosed a single embodiment thereof in the accompanying drawings, wherein—

Fig. 1 is a front elevation of the camera with the lens "cone" and the mechanism housing cover removed to show the cycling mechanism, the film feed clutch, the exposure counter, the shutter rewind mechanism, the switches for controlling the cycling mechanism and shutter release, and the receptacles for power supply and remote control, the entire mechanism being shown in its condition when the shutter has been rewound and a new area of film has been fed into position over the exposure opening and the camera is ready for making an exposure;

Fig. 2 is a section through the curtain rollers, the curtains and the exposure plate lengthwise the latter, the shutter curtains being shown in the run-down and capped condition;

Fig. 3 is a view similar to Fig. 2, the curtains having been rewound and the exposure slot or aperture thereof not yet established;

Fig. 4 is a view similar to Fig. 2, but showing the curtain exposure slot or aperture established and the curtains in condition for making an exposure;

Fig. 5 is a broken-away detail in top plan view of the curtains when in the condition shown in Fig. 2;

Fig. 6 is a similar top plan view of the curtains in the condition shown in Fig. 4;

Fig. 7 is a longitudinal section through the curtains showing the exposure slot or aperture, the curtains having just started to run down or across the exposure aperture;

Fig. 8 is a section similar to Fig. 7, the curtains having run down and the exposure slot or aperture being represented as having a greater dimension than the exposure slot or aperture shown in Fig. 4;

Fig. 9 is a horizontal sectional view through the shutter rewind mechanism equipped with means for varying the curtain aperture;

Fig. 10 is a sectional view through the shutter rewind mechanism, the first curtain driving stud having been released from the curtain rewind pawl;

Fig. 11 is a horizontal section through Fig. 9 on the line 11—11 thereof;

Fig. 12 is a horizontal section through Fig. 9 on the line 12—12 thereof, but showing the shutter set for a different speed and with the exposure slot or aperture established;

Fig. 13 is a horizontal section through Fig. 16 on the line 13—13 thereof;

Fig. 14 is a view partly broken away, but similar to Fig. 11, the shutter having been set for a different exposure slot or aperture;

Fig. 15 is a front elevation of the shutter rewind mechanism having incorporated the shutter setting knob, the shutter being set for a speed of .001 of a second, the mechanism being shown with the shutter in the act of being rewound and the driving pawl not yet released;

Fig. 16 is a view similar to Fig. 15, the driving pawl having been released, establishing the exposure slot or aperture in the shutter of a width providing for an exposure of .001 of a second;

Fig. 17 is a view similar to Fig. 16, the shutter setting knob having been removed to show more clearly the construction of the shutter rewind mechanism;

Fig. 18 is a view similar to Fig. 17, but with the shutter mechanism in the run-down condition; and Fig. 19 is a partial vertical section through the camera taken at the right of the curtain rewind rolls and showing the curtain rewind mechanism and the shutter release solenoid on line 19—19, Fig. 1, but omitting the switch from near the top thereof.

This invention relates to curtain slot adjusting means to control the exposure time of the shutter of a camera that is adapted to many uses, among them the photographing of flight instruments in an airplne in flight, or instruments used in running various tests, such as manometers, and for almost any purpose requiring a self-contained camera that makes an exposure upon the closing of an electric circuit and then automatically restores itself for a second exposure. The camera is also especially adapted for use as an aerial camera particularly when used for certain classes of work such as photographing the smoke given off by a bomb when it explodes upon hitting the ground. The camera can also be used for regular aerial photographic work. It is perfectly adapted for uses involving setting up a camera in a permanent installation so as to make photographs at predetermined intervals, the electrical circuit being closed by means of a time clock or any other suitable device. Since the camera is so constructed that lenses of almost any focal length can be used, the camera need not be close to the object being photographed. Another use for which this camera is perfectly adapted is for photographing games, such as baseball games, wherein several of such cameras will be mounted and directed at certain spots, such as the various bases, the pitcher's box, or any other desired area, so that one operator can control any one of the cameras at the proper instant by pushing a button and closing an electrical circuit. Such uses will serve to point out the versatility of this camera.

The principal object of this invention is to provide a camera having a self-capping focal-plane shutter of a variable exposure aperture type and having means for controlling the width of the opening of such exposure aperture during the time the curtains travel in a picture-making direction.

While the invention is directed to curtain slot adjusting means of a focal-plane shutter of the two-curtain type, of general application, it is disclosed in connection with automatic cycling means driven by an electric motor and controlled by the operation of the shutter itself, so that after each operation of the shutter the camera is automatically reset. I will refer only to such general parts of the camera as are shown in the figures of the drawings and particularly in Figs. 1 and 19, to which and to Figs. 2 to 8, I will first refer.

The camera body is made up mainly of two parallel spaced plates, one of which is termed the mechanism plate and is indicated at 20 in certain of the figures. Parallel therewith and spaced therefrom by nearly the width of the camera is another so-called outer plate, not herein shown, and between the said two plates normal thereto is a central channel member 22 attached to the mechanism plate 20 and having an exposure slot indicated at 22a in Fig. 7, being attached by rivets 23 and to the other outer plate by screws not shown. Positioned between said plate 20 and the said other outer plate are partitions 25, 26 of channel form and attached to the mechanism plate 20 by rivets 27 and to the other outer plate by screws, not shown. Also positioned between the mechanism plate 20 and the other outer plate is a "cone" support casting of any suitable shape indicated in dotted lines at 29 in Fig. 1, which casting is attached to the cone mechanism plate 20 by screws 30, 30 and to the other outer plate in any suitable manner not herein indicated. The mechanism plate 20 is provided with a groove 39 into which the cover member 31 (Fig. 19) is fitted, and the lens "cone" casting 29 is provided with a similar groove 40 indicated in dotted lines in Figs. 1 and 19. The structure is thus completely light-tight.

To the mechanism plate 20 is attached a film support stud 57, and there is provided a spring member 59 carried by the other outer plate for supporting the second film support stud, itself not shown. There is also provided a spring 61 for the second film spool support stud, not shown. Said springs 59 and 61 are riveted to the outer plate opposite the mechanism plate 20 in any suitable manner. A shaft 65 is provided having the usual film spool driving dog, not shown, and to the opposite end of the shaft 65, as shown in Fig. 1, is a film feed gear 67. Passing through the mechanism plate 20 and the other outer plate is a shaft 72 fitted to the right-hand end of which is a bell crank lever 82 having at the extreme lower end of the longer arm a lateral extension 82a. Free to turn on the shaft 72 is a washer 83 separating the pressure pad operating arm 84 that is riveted to the shaft 72, said arm 84 having an L-shaped end 85 into which is hooked a spring 87, the opposite end whereof is hooked to a spring support rod 88. Inasmuch as the pressure pad operating arm 84 is securely attached to the shaft 72, when said pressure pad operating arm 84 is turned in a contraclockwise direction viewing Fig. 1, the pressure plate or pad 56 (Fig. 1) will be caused to be lifted from the sensitized material, and when released the shaft 72 will be caused to turn in a clockwise direction, thus applying pressure to the sensitized material through the tension of spring 87. The said bell crank 82 is provided with a second arm 98 that engages the L-shaped or turned-over end 85 of the pressure pad operating arm 84. Thus any movement of the bell crank 82 in a contraclockwise direction will cause the shaft 72 also to be turned in a contraclockwise direction.

The structure thus far referred to is that pertaining to the general structure of the camera and to the pressure plate or pad mechanism. Obviously my invention is not limited to a camera of the specific structure thus far described, which has been set forth merely as one embodiment of means for supporting those portions of the photographic mechanism to which my invention more particularly applies.

*The shutter mechanism.*—I will next describe the shutter mechanism which, in the disclosed embodiment thereof, is motor driven by an electric motor within the camera body, and which shutter is disclosed as of the two-curtain focal-plane shutter type providing a variable aperture and which shutter is self-capping while being wound. In cooperation with the shutter there is provided automatic cycling means controlled by the operation of the shutter itself, so that after each operation the camera is ready for the next operation.

I will describe so far as the same is shown the specific construction provided for this purpose and in so doing will first refer to Figs. 1 and 2 to 8; and to Figs. 15 to 19.

The camera is provided with a first curtain take-up roller 91 and with a second curtain take-up roller 92. Each of the curtains is provided with the usual tension roller, the first curtain tension roller being indicated at 93 and the second curtain tension roller 94. In Fig. 19, certain of the parts are indicated in vertical section, including certain of the parts that are fitted to the mechanism plate 20. Therein is shown a bushing 95 through which passes the shaft 96 of the second curtain take-up roller 92, to which shaft is attached a pinion 97 meshing with the second curtain rewind gear 316. On the shaft 100 of the first curtain take-up roller 91 is attached the first curtain pinion 101 which meshes with the first curtain rewind gear 314 which, with the second curtain rewind gear 316 are carried on a stud shaft or stud 308, best indicated in Fig. 19. The said shaft or stud 308 is provided with a suitable separating collar and has a reduced diameter and a threaded end portion 309. The said shaft or stud passes through the mechanism plate 20 and is securely held thereto by nut 310 and locker washer 311.

There is provided a second curtain rewind latch or dog plate 319 attached to the second curtain rewind gear 316, and there is also provided on said plate a shutter release for dog 333 (shown in Figs. 1 and 11 to 14, hereinafter more fully referred to) which performs the function of the pin 116 of said parent application Ser. No. 527,918. There is also provided a main shutter gear 117 having a suitable bushing, and attached to said shutter gear 117 is a driving plate 118, shown in Figs. 9 and 10, to which is attached the shutter rewind clutch member 119 by suitable rivets. The said second curtain rewind gear 316 and the first curtain rewind gear 314 and the main shutter rewind gear 117 are all carried upon the same stud 308, best shown in Figs. 9 and 19.

In the particular type of camera herein disclosed in part, there is provided an electric motor of a conventional type procurable on the open market, but having a speed reducing transmission built thereon. Such a motor is diagrammatically indicated at 123, being attached to the inner face of the mechanism plate 20 by screws 124, 124. Suitably supported, there is provided a film feed drive gear 143, an interrupted gear 144 and a cam plate 146. There is also provided, supported upon a suitable shaft, a crank member 147 provided with a pin 148 securely attached with other parts to a suitable shaft by a large head screw 149, so that by loosening the screw 149 the crank member 147 can be adjusted circumferentially upon its shaft, and when the proper position is found the crank member and other parts there supported are clamped in place by means of said screw 149.

The film feed drive gear 143 meshes with the film feed clutch gear 150, and the interrupted gear 144 co-acts with a second interrupted gear 151, so as to provide an interrupted motion to the shutter rewind mechanism. Fitted to the mechanism plate 20 is a stud, not shown, having at its end a large head screw 156. Attached to the interrupted gear 151 is a drive gear 157. A suitable stud provides a bearing for a dial for counting the number of exposures upon the film, to which dial brief reference will now be made. There is also provided a bushing having a press fit in an idler gear 167. There is provided a knob 168 to which is attached the counter dial 169 of saucer-like formation, and a ratchet wheel 170. The said counter dial 169 is provided with a series of numbers 175, shown in Fig. 1, corresponding to the number of exposures that has been made. There is also fitted to the mechanism plate 20 a stud having a head 177, and upon said stud between the head 177 and a suitable washer is a bushing free to turn on such stud but having a press fit in a second idler gear 184 which meshes with the main shutter rewind gear 117 for rewinding the shutter curtains.

Shoulder rivets 193, 193 are shown for securing in position certain parts pertaining to a clutch member and interclutch member, not shown. The film feed clutch gear 150 runs on the outer surface of such interclutch member and meshes with the film feed drive gear 143. There is also provided a ratchet plate 194 suitably supported and provided with studs 195, 195 passing therethrough and engaging clutch rollers, not shown. The interclutch member, not itself shown, is provided with usual notches 199, shown in dotted lines in Fig. 1. Connecting the shoulder rivets 193, 195 are springs 200. Inasmuch as the shoulder rivets 193 are permanently attached to such interclutch member, and the shoulder rivets 195 are securely attached to ratchet wheel 194, the said springs 200 will cause the said ratchet plate 194 to be turned in a clockwise direction, thereby causing the referred to rollers to engage the bore of the film feed clutch gear 150. If such latter gear 150 is caused to be turned in a clockwise direction, such rollers will be caused to move in a clockwise direction, thus wedging between said interclutch member and the bore of the film feed clutch gear 150, thereby causing the interclutch member to be turned in a clockwise direction. If, however, the teeth of the ratchet plate 194 are engaged and prevented from moving, such rollers will be prevented from moving in a clockwise direction, thus releasing them from engagement with the bore of the said film feed clutch gear 150. When the said ratchet wheel or plate 194 is released, the springs 200 will again cause such rollers to be moved in a clockwise direction and such interclutch member will be driven by such rollers and the film feed clutch gear 150.

On the mechanism plate 20 is a stud having attached thereto a bushing to which is riveted a film feed clutch bell crank 203 held to the stud by a shoulder screw 204 and having a formation for engaging the pin 148 previously referred to as provided on the crank member 147. The purpose of the pin 148 will be more fully set forth subsequently.

The upper arm of the bell crank lever 203 is provided with a dog 206 to engage the teeth of the ratchet plate 194, and on the extreme upper end of the bell crank 203 is a finger-like extension 207 for engaging a suitable notch of a film measuring cam 51. When the finger 207 of the bell crank 203 is held out of such notch of said film measuring cam, the ratchet plate 194 will be allowed to rotate, thus causing the film clutch drive gear, not shown, to be driven through the clutch members previously referred to. Since the said clutch drive gear is in mesh with the film feed gear 67, the film spool will be caused to rotate in a contraclockwise direction, winding the film until the clutch drive gear is again stopped.

*The electric switches.*—I will next refer sufficiently to certain electrical switches and cooperating parts by which not only the feed of the film is controlled but also the operation of the shutter, and in doing so will refer to Fig. 1. To the mechanism plate 20 is attached a switch support plate 210 by means of rivets 211, 211, and to said switch support plate 210 is attached a switch 212, being a standard switch of any one of several different acceptable types. Herein for the purpose I have illustrated a switch known in the trade as the "Acro" switch, which is attached to the switch support plate by screws 213, 213. The said switch 212 is provided with contacts 214, 215 and 216. The contact 216 is carried on a spring 217 actuated by a semi-circular spring 218 through a short flat spring 219 and pin 220. When the said pin 220 is moved in an upward direction viewing Fig. 1, the position of the semi-circular spring 218 is changed, thus altering the center of effort, causing the spring 217 to be moved downward, thus closing the contacts 216 and 215. When the pin 220 is released, it will be moved in a downward direction by the spring 219, thus again changing the center of effort of spring 218 and causing the spring 217 to be moved in an upward direction, thus causing the meeting of contacts 214 and 216.

The said switch 212 is actuated by the bell crank 82, previously described, which is provided for the purpose with an arm 221 having a turned-over end 222 for co-acting with the pin 220. The said bell crank 82 is acted upon by the cam plate 146, previously described, through the finger 82n of said bell crank 82, when the film feed drive gear 143 is rotated.

Attached to the said mechanism plate 20 is the second switch support plate 223, by means of rivets 224, and attached to the said support plate is a switch 225 of structure preferably similar to the switch 212 excepting that it is provided with contacts 226, 227 only. The said switch 225 is also provided with a similar semicircular spring 228, a contact spring 229, a short actuating spring 230 and an operating pin 231. The said switch 225 is attached to the switch support plate 223 by screws 232, 232.

*Switch operating mechanism.*—I will sufficiently describe the switch operating mechanism for the electrical circuit controlling the shutter and film feeding means, and for that purpose I will refer to Fig. 1 and also to Fig. 19.

Mounted upon the said mechanism plate 20 is a switch operating lever 233 pivoted on a stud 234 on said plate, said operating lever being securely held upon such stud 234, so as freely to rotate thereon, by means of a large head screw 234a, and said operating lever is provided with a notch 235 to limit its motion, said notch co-acting with a pin 236 on the mechanism plate 20. The said switch operating lever is moved in a clockwise direction by a spring 237 fitted over a stud 238 attached to the said operating lever and pressing against the switch housing of the switch 225.

The said switch operating lever 233 serves both as a switch operating lever and also as a shutter run-down stop lever, it being engaged by said dog 333 on the latch or dog plate 319 attached to the second curtain rewind gear 316, when the shutter is released and runs all the way down, as will be more fully described, thus limiting the motion of the said second curtain rewind gear 316. At the same time said lever 233 causes the contacts 226, 227 to be closed, thus completing the circuit to the motor in a manner sufficiently described subsequently.

There is attached to the lower end of the bell crank lever 82 a short L-shaped arm 239 by means of a shoulder rivet 240, the said L-shaped arm being caused to be rotated in a contraclockwise direction by means not shown. When the bell crank 82 is caused to be turned to the right or contraclockwise by the cam 146, the teeth of ratchet wheel 170 will be engaged, thus causing the exposure counter dial 169 to be rotated in a contraclockwise direction. Referring to Fig. 19, attached to the mechanism plate 20 is a bushing 243 through which passes a shaft 244 having a reduced diameter indicated in dotted lines at 245, and to which is fitted a hub 246 having a crank arm 247, a shoulder screw 248 serving to attach both parts to the shaft 244, the opposite end whereof has an enlarged diameter 249 to which is attached a shutter release lever 250 engaging the dog 333 when the shutter is fully wound.

Attached to the mechanism plate 20 is a magnetic solenoid 251 by means of a strap 252, bolts 253 and nuts 254. The said solenoid has the usual plunger or armature shown in dotted lines in Fig. 1 and indicated at 255, which is provided with an enlarged collar 256, between which and the solenoid housing is a spiral spring 257 causing the armature to move to the right viewing Fig. 1, the right-hand end of said armature being provided with a hook member 258 having a slot 259. Securely attached to said crank arm 247 (Fig. 19) is a pin 260 which is acted upon by the hook member 258 when the solenoid 251 is energized. A stop pin 261 is provided on the mechanism plate 20, and there is also provided a cooperating protruding lip 262 on the said crank arm 247. When the circuit is broken, the spring 257 causes the solenoid plunger or armature to be moved a sufficient distance to the right viewing Fig. 1, co-acting with the collar 256 to that end.

*The shutter curtain rollers.*—I have previously described the structure of the two-curtain shutter excepting as to certain details of the tension rollers and take-up rollers thereof, which will be sufficiently described for the purpose of the present invention. The spring tension roller 93 for the first curtain and the spring tension roller 94 for the second curtain are identical in construction. Fitted into a hole provided therefor in the mechanism plate 20 is a shaft 263 extending through the tension roller 94 and through the outer plate parallel to the shutter plate 20 and securely locked thereto by means not shown. The tension rollers 93 and 94 are provided with bushings on either end. Each such bushing on the right-hand end is provided with a hole through which passes the end of a tension spring 268, thus locking one end of said spring to the proper tension roller. The opposite end of said tension spring 268 is anchored to the shaft 263, but is not herein shown.

*The two-curtain shutter movement.*—I will now describe the shutter and for that purpose I will refer to Figs. 2 to 8 showing the two curtains in longitudinal section and in plan.

Attached to the first curtain tension roller 93 and partly wound thereon and attached also to the first curtain take-up roller 91 is the first curtain 271 provided with an exposure slot or opening 272 and having the usual struts 273, 273. Attached to the second curtain tension roller 94 and partly wound thereon is a second curtain 274 which at its opposite end is attached to the second curtain take-up roller 92. The said second curtain 274 is provided with an exposure slot or opening 275 having the usual struts 276, 276. The first curtain take-up roller 91 is connected to the first curtain rewind gear 314 by means of the pinion 101. The second curtain take-up roller 92 is connected to the second curtain rewind gear 316 by means of the pinion 97. When the second and first curtain rewind gears 316 and 314 respectively are caused to be turned in a contraclockwise direction, the said take-up curtain rollers 91 and 92 will be caused to turn in a clockwise direction, thus winding said first and second curtains 271, 274 upon their respective tension rollers 93 and 94.

As shown in Figs. 9 and 10 and referring also to Figs. 11 and 12, the main shutter rewind gear 117 is caused to be turned in a contraclockwise direction, carrying with it the driving plate 118 and the shutter clutch rewind member 119. The end of the shutter rewind clutch 119a will engage the stud 326 of the first curtain rewind gear 314, causing it to be turned in a contraclockwise direction, causing the pinion 101 to be turned in a clockwise direction, and causing the first curtain take-up roller 91 also to be turned in a clockwise direction, thus winding said first curtain 271 on its take-up roller 91. The second curtain rewind gear 316 will also be driven in a contraclockwise direction by reason of an engaging stud 327 of the first curtain rewind gear 314 engaging the dog or latch plate 319, after said first curtain has traveled a distance sufficient to cap the second curtain 274, as shown in Fig. 2. The pinion 97 will now be turned in a clockwise direction, thus winding said second curtain 274 on its take-up roller 92 and when the said second curtain reaches the position shown in Fig. 3, the second curtain rewind gear 316 therefore is caused to be disengaged from the stud by reason of the cam plate 277 (Figs. 9, 10, 15 to 18) attached to the mechanism plate 20.

As the main shutter rewind gear 117 continues to turn in a clockwise direction, the curved end 119b of the shutter rewind clutch member 119 will ride along the under face of the cam 277, thus disengaging the end 119a of said clutch member from stud 326, but just previous to such disengagement the dog 333 has moved past the end of the shutter release lever 250 (best shown in Figs. 1 and 11), thus preventing the second curtain rewind gear 316 from turning in a clockwise direction when said stud 326 becomes disengaged from the shutter rewind clutch member 119, so that the first curtain rewind gear 314 will be permitted to turn in a clockwise direction until said stud 326 engages a stud 330 of the shutter setting knob 321 that extends through the second curtain rewind gear 316, thus preventing further movement of the first curtain rewind gear 314 in a clockwise direction. The two curtains will now be in the position shown in Fig. 4, with the exposure opening A formed between said two curtains.

It will be evident from the drawings and from the foregoing description that the curtain aperture is determined through the manipulation of the second curtain. The curtain slot is established at the completion of the rewinding of the shutter, as shown in Fig. 4, and the position of the struts 273, 276 is under control—that is, their rate of movement is in control with respect to each other throughout the exposure regardless of the initial separation of struts 273, 276. Both curtains continue to travel across the exposure opening of the camera and are stopped together after they have made a complete exposure and are not capped until the commencement of the rewinding cycle. This is because the second curtain is caused to move first, and then the first curtain is picked up. After the apertures have been capped, the curtains travel across the exposure opening in the capped condition, and when the shutter reaches a point just before being fully rewound, the first curtain is released and allowed to run in a direction toward an exposure opening, and thereby establishes the curtain aperture. Both curtains always travel exactly the same distance in each half cycle; that is, both curtains travel together when released for making an exposure, throughout that exposure, and are stopped together.

The focal plane shutter herein disclosed is made up of two curtains, each having an aperture that together form an exposure aperture when the shutter curtains are traveling in one direction, and said apertures are so spaced when the curtain is rewound as to constitute self-capping means and herein, during the rewinding cycle of the shutter, both curtains are wound up together in a light-tight condition until both the curtain apertures have traveled past the exposure opening of the camera in rewinding and then, as stated, just before the rewinding is completed, the first curtain is released and allowed to run back a certain predetermined distance, thus forming the exposure aperture by having the two curtain apertures in alignment.

This has never been accomplished in the prior art, which at the most discloses a two-curtain shutter wherein, when making an exposure, the curtain aperture is established when rewinding the curtain by causing the second curtain to stop and allowing the first curtain to continue winding until a slot is established, and it is held in that position until both curtains are released, whereupon they start to travel across the exposure opening, and when the second curtain strut has passed the camera exposure opening, that curtain is stopped but the first curtain continues to travel past the exposure opening of the camera and past the strut of the second curtain, thus capping the shutter. Such a construction provides no control of the curtain aperture except for a very narrow slot, and such construction would be ineffective for wider slots or for a full aperture slot such as used for slow exposures.

The shutter disclosed herein is capable of operating at very high speeds, particularly because when the shutter runs down, nothing rotates except the pinions 97, 101 and their drive gears 314, 316, as such gears are wholly disconnected from the main rewind gear 117 when making an exposure.

A resume of the two-curtain shutter movements is as follows, reference being made to Figs. 1 to 8. The first curtain 271 has an aperture 272 and a rewinding roller shaft having a pinion 101 meshing with the rewinding gear 314. The second curtain 274 has an aperture 275, a rewind shaft 96 carrying a second curtain rewind roller 92 and has a pinion 97 meshing with the second curtain rewind gear 316. Said gear 316 is prevented from turning in a clockwise direction by shutter release lever 250 and the dog 333 on dog or latch plate 319 (Figs. 11 and 14) fast to said rewind gear 316, and the rewind gear 314 is prevented from turning in a clockwise direction because of pin 330 of the shutter setting knob 321 engaging pin 327 of the rewind gear 314, as subsequently explained. Since the curtain rollers are driven by the gears just referred to, they too will be held from turning. To make an exposure, shutter release lever 250 is disengaged from the dog 333 on the dog or latch plate 319 fast to the second curtain rewind gear 316, allowing it to turn clockwise. This will also allow said first curtain rewind gear 314 to turn, both gears turning in a clockwise direction. Said first curtain gear 314 cannot turn faster than the said second curtain gear 316 because the pin 327 of said first curtain rewind rewind gear 314 cannot pass the pin 330 of the shutter setting knob 321 extending through the gear 316, and since first curtain 271 is provided with a slightly higher spring tension than second curtain 274, the said pin 327 will be held in contact with the other pin 330 throughout the exposure travel. When the curtain is fully run down, the second curtain gear 316 will be stopped through dog 333 engaging lever 233, shown in Fig. 1, and of course the first curtain 271 will also be stopped by reason of said interengaging pins. In rewinding, the main rewind gear 117 is caused to be rotated in a contraclockwise direction. Said first curtain rewind gear 314 will be caused to be rotated in a contraclockwise direction through the clutch member 119, and such rewind gear 314 will continue to rotate, carrying with it pin 327, and when such pin engages the end of the notch in dog or latch plate 319 fast with the second curtain rewind gear 316, it too will be caused to turn as subsequently explained, but while said first curtain rewind gear 314 was turning through that part of a revolution represented by the spacing of the pins referred to, the first curtain 271 will have been moved sufficiently far to cap the exposure opening. Both the second curtain rewind gear 316 and the first curtain rewind gear 314 will continue to rotate until the dog 333 has been engaged by shutter release lever 250 and at substantially the same time the clutch member 119 will, as hereinafter more fully explained, be disengaged from pin 326 of the first curtain rewind gear 314, thus preventing forward movement of either of said rewind gears in a contraclockwise direction. Said first curtain rewind gear 314 will now be caused to turn in a clockwise direction under the influence of the first curtain tension roller and will continue to rotate in a clockwise direction until stopped by pin 327 of such rewind gear 314 engaging pin 330 of the shutter setting knob 321. This movement is sufficient to allow the first curtain aperture to travel far enough over the second curtain aperture to establish the exposure aperture in the pair of curtains. The shutter is now ready for its second exposure. Both curtain rewind gears 316, 314 and both curtain rewind rollers 91, 92 always turn the same amount when the shutter is rewound, but the first curtain rewind roller is allowed to make an initial rotation in a curtain-rundown direction just after it has been fully rewound.

When the shutter release lever 250 is operated by the solenoid magnet 251, previously referred to, the said dog 333 will be disengaged by the shutter release lever 250, allowing both curtain rewind gears 316, 314 to turn in a clockwise direction, and pins pertaining thereto will remain in contact until the said dog 333 is stopped from further movement by the switch operating lever 233.

Then the main shutter rewind gear 117 is again caused to be turned in a contraclockwise direction, resulting in winding the first curtain 271 into the position shown in Fig. 2, in which position said first curtain caps the exposure slot or aperture 275 of the second curtain 274, which reciprocally caps the exposure slot or aperture 272 of the first curtain 271 with the result that the second curtain 274 will be driven until the main shutter rewind gear 117 makes a complete revolution, and before the end of such complete revolution, the shutter rewind member 119 (Figs. 9 and 10) is disengaged from the pin 326 through the action of the cam plate 277.

It will be noted that the first curtain take-up roller 91 is of a somewhat larger diameter than the second curtain take-up roller 92. This is for the purpose of allowing the first curtain 271 to move at a slightly greater rate than the second curtain 274, so as to allow the aperture A, as indicated in Fig. 7, to increase as the two curtains travel across the exposure opening of the camera.

In Fig. 7, the exposure slot or aperture formed at A at the start of the curtain travel is of less dimension in its direction of travel than the exposure slot or aperture formed at B (Fig. 8), when the two curtains approach the end of their travel across the said exposure opening of the camera. This is to compensate for curtain acceleration. In other words, exposure time is dependent upon the width of the exposure slot or aperture and curtain speed, and since all shutter curtains accelerate in their travel from the curtain take-up roller to the curtain tension roller, it is necessary to provide means for compensating for this decreasing exposure speed. This I accomplish by slightly increasing the width of the exposure slot or aperture A to the width indicated at B.

*The camera cycle.*—Referring to Fig. 1, I will sufficiently describe the cycle of the camera when using the curtain shutter mechanism and the control therefor just described. Thus far I have referred to a shutter mechanism having provision for one width only of the exposure slot or aperture. While this is entirely satisfactory for a great number of uses of the camera herein disclosed, for other uses of the camera it is necessary to be able to change the shutter exposure aperture so as to provide a greater range of shutter speed, but the camera cycle is in no way changed when using the shutter with provision for changing the aperture exposure width thereof.

In Fig. 1, the camera mechanism is shown in condition for making an exposure under the control of the electric circuit of the camera. The two-curtain shutter in the position of the parts as shown in Fig. 1 has been fully rewound and is held in position for making an exposure by means of the shutter release lever 250 and the dog 333. The switch 225 is in open condition because the switch operating lever 233 has been moved to the right, viewing Fig. 1, by the spring 237, and the switch 212 is in condition to complete a circuit from a receptacle 279 that, as shown in Fig. 1, is attached to the mechanism plate 20 by means of screws 280, 280, inasmuch as the arm 221 of the bell crank 82 has been moved away from the switch pin 220, thus allowing the contacts 214 and 216 to be closed. The shutter will now be caused to operate if the external switch (not shown) is closed, which switch can be located anywhere convenient to the operator, and if desired within or upon the camera itself. The complete wiring circuit is not shown in this application. Parts thereof not already referred to, are indicated as follows, namely, a terminal 286 of a receptacle 287 held to the mechanism plate 20 by screws 288. One side of the battery (not shown) is connected to a terminal 294 of the receptacle 287. There is also shown at one side of the solenoid 251 a connection to the terminal 302 of the said receptacle 279.

When the mechanism is in the position of parts shown in Fig. 1, switch contacts 226 and 227 of switch 225 will be in open condition, and the contacts 214 and 216 will be in closed condition. Therefore no current will flow to the motor, but when the external switch (not shown) is closed, current will flow so that the solenoid 251 will now cause the shutter release lever 250 to be moved to the right, viewing Fig. 1, as previously described, releasing the two-curtain shutter which will now be allowed to run down. As the said shutter runs down the dog 333 contacts with the lower end of the switch operating lever 233, causing the switch 225 to be operated, thereby closing contacts 226 and 227. Current will now flow through the wires or elements of the circuit (not shown).

*The cycle of operation of the mechanism controlling the shutter rewind and the film.*—The electric motor 123 will now start to operate and through its speed reducing mechanism previously referred to, it will drive the interrupted gear 144 in a contraclockwise direction until the teeth thereof engage the teeth of the second interrupted gear 151, at which time the drive gear 157 will be turned in a clockwise direction and the idler gear 167 will be turned in a contraclockwise direction. The intermediate gear 184 will be turned in a clockwise direction and the main shutter rewind gear 117 in a contraclockwise direction, thereby rewinding the two-curtain shutter in the manner previously described. Soon after the said interrupted toothed gear 144 starts to rotate, the nose 82a of the bell crank 82 will be acted upon by the cam 146, causing the said bell crank 82 to be moved, which movement in a contraclockwise direction causes switch operating pin 220 of the switch 212 to be operated, thereby opening the contacts 214 and 216 and breaking the circuit to the shutter release solenoid 251 and closing the contacts 215, 216, which are shunted around the contacts 226 and 227 of the switch 225. This continues the circuit to the motor after the second curtain rewind gear 316 starts to rotate in a contraclockwise direction, thus carrying with it the dog 333 from contact with the switch operating lever 233. The switch contacts 226 and 227 will then be caused to open by the spring 237 and the electric motor 123 will continue to operate until the interrupted toothed gear 144 has made a complete revolution, at which time the nose 82a of the bell crank lever 82 will drop off the cam 146, thus allowing the bell crank lever 82 to move to the left (that is, in a clockwise direction, viewing Fig. 1) and allowing the switch operating pin 220 to move in a downward direction, causing the contacts 215 and 216 to be opened, thus stopping the motor. This completes the shutter rewind cycle.

At the commencement of the said cycle, the pin 148 carried on the crank member 147 is caused to turn in a contraclockwise direction, thus acting upon a cam-shaped formation of the bell crank 203, causing the latter to be turned in a contraclockwise direction and at the same time withdrawing the pawl 206 from the teeth of the ratchet wheel 194. The film feed clutch gear 150 will now be caused to be driven clockwise through the film feed clutch means, turning said film feed gear 67 contraclockwise, thus winding the film on the film take-up spool positioned on shaft 65. Film will be drawn off the spool that is placed upon the studs, one of which is shown at 57.

When sufficient film has passed over the surface of the measuring roll, the notch of the measuring cam 51 will reach the position shown in Fig. 1, wherein the L-shaped finger-like member 207 of the bell crank 203 will drop into such notch, thus allowing the bell crank 203 to be rotated in a clockwise direction. The pawl 206 will engage the teeth of the ratchet gear or plate 194, thus disengaging the film feed clutch gear 150 (Fig. 1), and no further film will be wound on the film take-up spool.

A complete cycle of operation has now taken place in the course of which the shutter has been released and has run down, the motor has been energized, the shutter has been completely rewound, and a new area of film has been fed into place. As the bell crank 82 was first moved to the right and then to the left viewing Fig. 1, the ratchet wheel 170 will have been caused to move a distance equal to one tooth of said ratchet wheel, thus advancing the film counter-dial one numeral, the film counter-dial previously having been set to the letter "S" (not shown) when a new supply of film was placed in the camera. This can be readily done by rotating the knob 168 in a contraclockwise direction until the letter "S" appears in the window. The letter "S" is used upon the camera in place of zero to signal the start of the first exposure.

The foregoing disclosure is of a photographic camera provided with a two-curtain shutter without the provision of means for changing the exposure slot or aperture for the purpose of making exposures having definite exposure timing. It is often desirable in a camera of this type to have means for changing the size of the exposure aperture in the picture-taking direction of movement of the shutter. I will now describe one embodiment of means for accomplishing this purpose, shown in Figs. 9 to 19, but to which mechanism my invention is not restricted.

*The mechanism for changing the shutter exposure aperture.*—Referring first to Figs. 9, 10 and 19, there is attached to the mechanism plate 20 the stud 308 having a reduced diameter portion 309 threaded as shown and receiving the nut 310 and the lock washer 311. Fitted over the said stud 308 is an enlarged collar 312 serving to space the shutter rewind gear 117 from the said mechanism plate 20. The said main shutter rewind gear 117, the disk 118 and the clutch 119 need no further description at this point. Integral with said stud 308 is an enlarged flange 313 serving to hold said main shutter rewind gear 117 and the disk 118 to the mechanism plate 20. Fitted over said stud 308 is the first curtain rewind gear 314 having a hub 315, and also fitted over the said stud 308 is the second curtain rewind gear 316 having a hub 317, both said curtain rewind gears being held in place on said stud 308 by a large head screw 318. Attached to the said second curtain rewind gear 316 is the previously mentioned latch plate 319, by means of rivets 320, 320.

Fitted to the gear hub 317 is a shutter setting knob 321 provided with an enlarged diameter 322 and a knurled diameter 323, said knob being caused to be moved toward the second curtain rewind gear 316 by spring 324, one end whereof rests against the spring retainer plate 325 attached to the hub 317.

The first curtain rewind gear 314 is provided with a drive pin 326 for engaging the shutter rewind clutch member or latch plate 319, as previously described, and said gear 314 is also provided with a second pin 327 extending through a notch 328 in the latch plate 319 and partially through a segmentally shaped opening 329 in the said second curtain rewind gear 316. The knob 321 is provided with a pin 330 also passing through the said segmental opening 329 of the second curtain rewind gear 316, and into the slot 328 of the latch plate 319. The knob 321 is provided with a pin 331 (shown in dotted lines in Fig. 9 and in solid lines in Fig. 13), said pin 331 engaging any one of a series of holes 332 in said second curtain rewind gear 316, one of said holes being shown in section (Fig. 13) and all the said holes being shown in Figs. 17 and 18.

The operation of the shutter having the described provision for changing the area of the exposure aperture is as follows: The said main shutter rewind gear 117 is caused to be turned in a contraclockwise direction, turning with it the driving plate 118 and the shutter rewind clutch member 119 having a drive end 119a that engages the drive pin 326 of the first curtain rewind gear 314 which is then caused to be turned in a contraclockwise direction, viewing Fig. 15, carrying with it pin 327 which will turn in a contraclockwise direction in the segmental opening 329 of the second curtain rewind gear 316, and in the slot 328 of the latch plate 319 until the pin 327 reaches the end of the said segmental opening 329.

The said second curtain rewind gear 316 and the latch plate 319 will now be turned in a contraclockwise direction until the dog 333 of the latch plate 319 passes the shutter release lever 250, at which time the shutter rewind clutch member 119 will be disengaged from the pin 326 by means of cam plate 277, as previously described. The said second curtain rewind gear 316 will then be allowed to turn slightly in a clockwise direction until the dog 333 is engaged by the shutter release lever 250, and the first curtain rewind gear 314 will turn in a clockwise direction until the pin 327 is stopped from moving further in a clockwise direction by the pin 330 attached to the shutter setting knob 321. An exposure slot or aperture is now established in the curtain structure for making an exposure.

Referring to Figs. 17 and 18, if the pin 331 of the shutter setting knob 321 is moved to engage a different hole 332 in the second curtain rewind gear 316, the position of the pin 330 will be correspondingly changed, as shown in Fig. 14, wherein pin 330 has been moved all the way in a clockwise direction, thus allowing the greatest possible travel of the pin 327 and the first curtain rewind gear 314, thereby establishing the greatest possible dimension of the exposure slot or aperture of the shutter. If the pin 331 were fitted in one of the other holes 332, the pin 327 and the first curtain rewind gear 314 could not rotate so far in a clockwise direction and in such case there would be established an exposure slot or aperture of a narrower width.

It will be readily understood that the second curtain rewind gear 316 may be provided with any number of holes 332 for engaging the pin 331 of the knob 321, thus providing means for obtaining any number of exposure slot or aperture widths in the shutter curtain structure.

It will be assumed that the shutter is in a wound-up condition ready for making an exposure. The shutter release lever 250 will be caused to operate in the manner previously described, thus disengaging the dog 323 of the latch plate 319. Both shutter rewind gears 314 and 316 will now be allowed to turn in a clockwise direction, thus allowing the pinions 97 and 101 to turn in a contraclockwise direction, thereby causing the said shutter curtains 271 and 274 to travel across the exposure opening of the camera. When the said shutter curtains run all the way down, the said second curtain rewind gear 316 will be stopped from further movement because the dog 333 will be engaged by the switch operating lever 233.

By providing graduations on the shutter setting knob plate 334, as indicated in Fig. 1 by the numerals 250, 500, 1000 and the index marker 335 on the shutter spring retaining plate 325, any selected exposure aperture can be secured by causing the knob 321 to be moved in a left-hand direction (viewing Fig. 19), thus disengaging the pin 331 from the hole 332 in said second curtain rewind gear 316, and then rotating the knob 321 until the index marker 335 is aligned with the proper shutter speed. The pin 331 will then engage the proper hole 332 in the said shutter curtain rewind gear 316. The knob 321 is moved to the right, Fig. 19 (that is, in an upward direction as shown in Fig. 13), by means of the spring 324 in order to provide the proper location of the pin 330, so as to cause the proper size exposure slot or aperture to be established by the curtains for a corresponding exposure speed.

It has been stated hereinabove that the cycling means is controlled by the operation of the shutter. In order that this statement may be fully understood, the timing and order of movement of the parts will be recapitulated. The operation of the shutter from the time the contacts are closed at the control switch until the cycle is completed has, of course, been stated, in describing the details of the structure. A résumé of the entire operation is as follows:

The control switch is closed thus energizing the solenoid 251. It will be assumed that the mechanism is in the condition shown in Fig. 1. The shutter release lever 250 will be caused to turn in a clockwise direction, disengaging dogs 333, allowing rewind gear 316 and rewind gear 314 to rotate in a clockwise direction under the influence of pinions 97 and 101, thus allowing the curtains to move across the exposure aperture in a left-hand direction viewing Fig. 1, until the dog 333 is stopped by the operating lever 233, which at this time will be caused to turn in a contraclockwise direction, operating switch 225, which will complete a circuit to the motor 123 causing it to revolve, thus turning the interrupted gear 144 and film rewind gear 143 in a contraclockwise direction. The interrupted gear 144 will, at the proper time, cause the second interrupted gear 151 to turn in a clockwise direction, turning with it gear 157 in the same direction. This will cause idler gear 167 to be turned in a contraclockwise direction and second idler gear 184 to be turned in a clockwise direction, thus turning the main rewind gear 117 in a contraclockwise direction; and, through the rewind clutch, rewind gear 316 and rewind gear 314 will be caused to turn in a contraclockwise direction, thus turning pinions 97 and 101 in a clockwise direction until the shutter is fully rewound. At this time, the cam plate 146 will be in the position shown in Fig. 1, and the bell crank 82 will be in the position shown in said figure, having just dropped off the cam 146, thus allowing the switch 212 to operate, opening the circuit to the electric motor. Just as the nose 82a of the bell crank 82 dropped off the cam face of cam 146, the rewind clutch was caused to be disengaged as previously fully described, allowing rewind gear 316 and rewind gear 314 to turn a short distance in a clockwise direction until stopped by a the shutter release lever 250 engaging dog 333. The shutter is now ready for a second exposure. The mechanism will be positioned as shown in Fig. 1. The exposure aperture will have been established in the curtain all ready for making an exposure.

The operation of the shutter and cooperating parts as thus set forth is therefore very clearly distinguished from the electrical control for functioning parts of an aerial camera set forth in an application filed in the names of Louis D. Nadel, Archie H. Gorey, Reynold J. Nitsch and Oscar Steiner, now Patent No. 2,371,592, dated March 13, 1945, wherein the shutter is operated mechanically for the making of a picture through cycling mechanism. Therefore, there is no delay in the shutter operation as the motor does not start to operate until the shutter has been operated and is entirely across the exposure aperture of the camera. Hence, it is impossible to have the cycle take place or even to begin before the shutter has traveled completely across the exposure opening of the camera. Therefore, no matter to how fast a speed the camera cycle is adjusted, it cannot in the present disclosure operate so fast that the shutter does not have time to travel all the way across the exposure opening of the camera, because the cycle cannot commence until the shutter has traveled all the way across the exposure opening, the rewind cycle being controlled from the shutter through the operating lever 233, co-acting with the dog 333 and the switch 225.

In the present disclosure there is provided a true self-capping variable aperture shutter. The shutter is always rewound in a capped condition and the exposure slot or aperture is established just as the shutter is completely rewound and before releasing it for an exposure. Such construction is therefore clearly distinguished from that shown in the patent to Petit and Hinelines, No. 1,980,546, dated November 13, 1934, wherein the exposure slot or aperture is adjusted by the operator prior to making an exposure and that exposure slot or aperture travels across the exposure opening both when making an exposure and when rewinding the shutter.

So far as I am aware, I believe that I am the first to provide any means to cause positively an increase in the size of the curtain exposure slot or aperture as the curtain travels across the exposure opening, thus compensating for the inevitable acceleration in the speed of the shutter curtain in its travel. As herein disclosed, I accomplish this result by providing curtain rewind rollers of contrasting diameter, as hereinbefore described. I thus cause the exposure slot or aperture to enlarge as said exposure slot or aperture travels across the exposure opening of the camera at a controlled rate of speed, the means for accomplishing this being the difference in size of the two-curtain rewind or take-up rollers. If one of said rollers is larger than the other, the former will feed off more curtain substance than the other, and if the larger roller pertains to the leading curtain, this will cause the exposure slot or aperture to enlarge in size. If, however, the larger rewind or take-up roller pertains to the second or following curtain, this will cause the exposure slot or aperture to become smaller during curtain travel.

This feature of compensating for the inevitable acceleration in the speed of the shutter curtain functions substantially simultaneously with the disclosed means for adjusting the size of the shutter exposure aperture prior to the release of the shutter. Both of the said features combine to provide for a perfect exposure. Notwithstanding the fact that an adjustment is made of the size of the aperture prior to the release of the shutter, there is still the tendency of one of the curtains to accelerate in speed, and it is the purpose of one of the features of my invention to overcome this, even when means are provided to adjust the size of the exposure opening prior to release of the shutter.

My invention herein claimed includes not only the means disclosed in Figs. 9 to 19, but also combinations of the same with other co-acting features of the shutter mechanism. It includes in a photographic camera a two-curtain focal-plane shutter, each of the curtains whereof is provided with an exposure opening, together providing the exposure slot or aperture, and also provided with a take-up roller and a tension roller, operating means for said two-curtain shutter including releasing means, and including rewinding means acting to rewind the said curtains in a self-capping relation by mutually covering the exposure openings thereof, exposure slot-width adjusting, manually operable means for varying and predetermining the width of the exposure slot or aperture before the release of the shutter for exposure, and means co-acting with said exposure slot-width adjusting means at each such manual slot adjustment, to compensate for shutter acceleration.

Having thus described one illustrative embodiment of the invention, it is to be understood that although specific terms are employed, they are used in a generic and descriptive sense and not for purposes of limitation, the scope of the invention being set forth in the following claims.

I claim:

1. In a shutter movement for photographic cameras, a focal plane shutter consisting of two, closely parallel, apertured curtains, the respective apertures whereof constitute the exposure aperture of the shutter, take-up and tension rollers for said curtains respectively, said take-up rollers having rewinding shafts with pinions thereon, means to release and means to rewind said curtains, and means to change the size of the said exposure aperture prior to shutter release, said rewinding means and said aperture-size-changing means including a first curtain rewind gear 314 and a second curtain rewind gear 316, said rewind gears respectively meshing with said pinions on the rewinding shafts of the first curtain and the second curtain, the said second curtain rewind gear 316 having a hub 317, a latch plate 319 fast with said second curtain rewind gear 316, a clutch member 119 at one side of the first curtain rewind gear 314, said first curtain rewind gear 314 having a drive pin 326 to be engaged by said clutch member 119, the said curtain rewind gears 314 and 316, the clutch member 119 and the latch plate 319 having adjustable operative connections for rewinding the two curtains and for controlling the size of the exposure aperture, and a shutter setting knob 321 mounted loosely on the said hub 317 of the second curtain rewind gear 316 and having a formation to engage cooperatively a formation of the second curtain rewind gear 316.

2. A construction in accordance with claim 1, but wherein the first curtain rewind gear 314 is provided with a second pin 327 on its face opposite to that carrying the drive pin 326, and wherein the said latch plate 319 is provided with a segmental cut-out part 328, and wherein the said second curtain rewind gear 316 is provided with a segmental opening 329 in alignment with the segmental cut-out part 328, and wherein the said shutter setting knob 321 has a pin 330 extending through the said segmental opening 329 in said rewind gear 316 into the said cut-out part 328 of the said latch plate 319, so that said pins 327 and 330 may laterally engage each other in the said cut-out part 328 and said segmental opening 329, and wherein the said rewind gears 314 and 316 and the said latch plate 319 are co-axially mounted.

3. A construction in accordance with claim 1, but wherein the first curtain rewind gear 314 is provided with a second pin 327 on its face opposite to that carrying the pin 326, and wherein the said latch plate 319 is provided with a segmental cut-out part 328, and wherein the said second curtain rewind gear 316 is provided with a segmental opening 329 in alignment with said segmental cut-out part 328, and wherein the said shutter setting knob 321 has a pin 330 extending through the said segmental opening 329 in said rewind gear 316 into the said cut-out part 328 of the said latch plate 319, so that said pins 327 and 330 may laterally engage each other in the said cut-out part 328 and said segmental opening 329, and wherein the said shutter setting knob 321 has a pin 331 laterally extending therefrom toward the adjacent face of the second curtain rewind gear 316, and wherein the said rewind gear 316 has a circumferentially arranged series of holes 332 for the selective reception, in any one of them, of the said pin 331 carried by the shutter setting knob 321, and wherein the said rewind gears 314 and 316 and the said latch plate 319 are co-axially mounted.

4. A construction in accordance with claim 1, but wherein the first curtain rewind gear is provided with a second pin 327 on its face opposite to that carrying the pin 326, and wherein the said latch plate 319 is provided with a segmental cut-out part 328, and wherein the said second curtain rewind gear 316 is provided with a segmental opening 329 in alignment with said segmental cut-out part 328, and wherein the said shutter setting knob 321 has a pin 330 extending through the said segmental opening 329 in said rewind gear 316 into the said cut-out part 328 of the said latch plate 319, so that said pins 327 and 330 may laterally engage each other in the said cut-out part 328 and said segmental opening 329, and wherein the said latch plate 319 has a dog 333, and wherein there is a shutter release lever 250 arranged to engage the said dog 333, thereby to hold the said latch plate 319 from turning movement, and wherein the said rewind gears 314 and 316 and the said latch plate 319 are co-axially mounted.

5. A construction in accordance with claim 1, but wherein the first curtain rewind gear 314 is provided with a second pin 327 on its face opposite to that carrying the pin 326, and wherein the said latch plate 319 is provided with a segmental cut-out part 328, and wherein the said second curtain rewind gear 316 is provided with a segmental opening 329 in alignment with said segmental cut-out part 328, and wherein the said shutter setting knob 321 has a pin 330 extending through the said segmental opening 329 in said rewind gear 316 into the said cut-out part 328 of the said latch plate 319, so that said pins 327 and 330 may laterally engage each other in the said cut-out part 328 and said segmental opening 329, and wherein the said shutter setting knob 321 has a pin 331 laterally extending therefrom toward the adjacent face of the second curtain rewind gear 316, and wherein the said rewind gear 316 has a circumferentially arranged series of holes 332 for the selective reception, in any one of them, of the said pin 331 carried by the shutter setting knob 321, and an index marker on the shutter setting knob 321, the said specified construction and arrangement of parts permitting any desired exposure aperture to be secured by manual lateral movement of the said knob 321, thus disengaging its pin 331 from that one of the series of holes 332 in said second rewind gear 316 in which it was engaged, and then by manually turning the said knob 321 until the said index marker is aligned with the desired shutter speed and by thereupon engaging the said pin 331 of the said knob 321 with the newly selected hole 332 in the second curtain rewind gear 316, and wherein the said rewind gears 314 and 316 and the said latch plate 319 are co-axially mounted.

6. In a shutter movement for photographic cameras, a focal plane shutter consisting of two, closely parallel, apertured curtains, the respective apertures whereof constitute the exposure aperture of the shutter, take-up and tension rollers for said curtains respectively, said take-up rollers having rewinding shafts with pinions thereon, means to release and means to rewind said curtains, and means to change the size of the said exposure aperture prior to shutter release, said rewinding means and said aperture-size-changing means including a rewind gear for the first curtain, a rewind gear for the second curtain, and driven from said first curtain rewind gear, said rewind gears respectively meshing with said pinions on the rewinding shafts of the first curtain and the second curtain, a shutter setting knob mounted loosely on and manually turnable with respect to the second curtain rewind gear, and having two laterally projecting pins to engage said second curtain rewind gear, the latter, for that purpose, having a segmentally shaped opening to receive one of said pins of said knob, and also having a series of spaced circumferentially extending formations with any one of which the other of said laterally projecting pins of the shutter setting knob may be engaged in the turning movement of the said knob, a drive-pin-like element on the said first curtain rewind gear, a clutch member to engage said drive-pin-like element, and means to impart rotative movement to said clutch member, said rewind gears for the two curtains, said knob and the said clutch member having adjustable operative connections for rewinding the two curtains.

7. In a shutter movement for photographic cameras, a focal plane shutter consisting of two, closely parallel, apertured curtains, the respective apertures whereof constitute the exposure aperture of the shutter, take-up and tension rollers for said curtains respectively, said take-up rollers having rewinding shafts with pinions thereon, means to release and means to rewind said curtains, and means to change the size of the said exposure aperture prior to shutter release, said rewinding means and said aperture-size-changing means including a rewind gear for the first curtain, a rewind gear for the second curtain and driven from said first curtain rewind gear, said rewind gears respectively meshing with said pinions on the rewinding shafts of the first curtain and the second curtain, a shutter setting knob mounted loosely on and manually turnable with respect to the second curtain rewind gear, having two laterally projecting pins to engage said second curtain rewind gear, the latter, for that purpose, having a segmentally shaped opening to receive one of said pins of said knob, and also having a series of spaced circumferentially extending formations with any one of which the other of said laterally projecting pins of the shutter setting knob may be engaged in the turning movement of the said knob, a drive-pin-like element on the said first curtain rewind gear, and a main shutter drive gear having a shutter rewind clutch member to engage said drive-pin-like element, said rewind gears for the two curtains, said knob and the said clutch member having adjustable operative connections for rewinding the two curtains.

8. A construction in accordance with claim 6, but wherein there is a second pin on the rewind gear for the first curtain, and wherein there is a latch plate fast with the rewind gear for the second curtain and having an arcuate slot, and wherein the rewind gear for the second curtain has a segmental opening in alignment with said arcuate slot, and wherein the said shutter setting knob has a pin extending through the said segmental opening into the arcuate slot of the latch plate.

9. A construction in accordance with claim 6, but wherein there is a second pin on the rewind gear for the first curtain, and wherein there is a latch plate fast with the rewind gear for the second curtain and having an arcuate slot, and wherein the rewind gear for the second curtain has a segmental opening in alignment with said arcuate slot, and a circumferentially extending series of holes, and wherein the said shutter setting knob has a pin extending through the said segmental opening into the arcuate slot of the latch plate, and wherein the said shutter setting knob also has a pin to engage, upon manual movement of said shutter setting knob, any one of said series of holes in the rewind gear for the second curtain.

10. A construction in accordance with claim 6, but wherein there is a second pin on the rewind gear for the first curtain, and wherein there is a latch plate fast with the rewind gear for the second curtain and having an arcuate slot, and wherein the rewind gear for the second curtain has a segmental opening in alignment with said arcuate slot, and a circumferentially extending series of holes, and wherein the said shutter setting knob has a pin extending through the said segmental opening into the arcuate slot of the latch plate, and wherein the said shutter setting knob also has a pin to engage, upon manual movement of said shutter setting knob, any one of said series of holes in the rewind gear for the second curtain, and wherein the said latch plate has a dog, and wherein there is a shutter release lever arranged to engage said dog, thereby to hold said latch plate from turning movement.

11. A construction in accordance with claim 6, but wherein there is a second pin on the rewind gear for the first curtain, and wherein there is a latch plate fast with the rewind gear for the second curtain and having an arcuate slot, and wherein the rewind gear for the second curtain has a segmental opening in alignment with said arcuate slot, and a circumferentially extending series of holes, and wherein the said shutter setting knob has a pin extending through the said segmental opening into the arcuate slot of the latch plate, and wherein the said shutter setting knob also has a pin to engage, upon manual movement of said shutter setting knob, any one of said series of holes in the rewind gear for the second curtain, the construction and arrangement of said parts being such that any desired exposure aperture can be secured by manually moving the said knob to disengage the pin thereof from one of the holes in the rewind gear for the second curtain, and then manually rotating the said knob and engaging said pin with the newly selected hole of the series of holes in the said rewind gear for the second curtain.

12. A photographic camera having a focal-plane shutter consisting of two, closely parallel, first and second, cooperating, apertured curtains, each having a tension roller and a take-up roller, first and second curtain rewind gears co-axially mounted and in meshing relation with the respective take-up rollers of said curtains and one of them having a laterally projecting pin and the other having a segmentally shaped opening in which said pin is received for movement therein, in a direction circumferentially of the said rewind gears, shutter release means and manually-operable exposure-slot width-adjusting means for predeterminedly varying the width of the exposure slot or aperture before the release of the shutter for exposure, said last mentioned means including said rewind gears for the two curtains and also including a shutter setting knob manually turnable with respect to the second curtain rewind gear and having two laterally projecting pins, one of which is received in said segmentally shaped opening and the other of which is variably engageable with the curtain rewind gear having said segmentally shaped opening, said first curtain rewind gear having a laterally-extending driving formation, and rotatable means in operative relation to said first curtain rewind gear to engage said driving formation, said two rewind gears, said knob and said rotatable means having adjustable operative connections for rewinding the two curtains and for controlling the size of the exposure aperture.

13. In a shutter movement for photographic cameras, a focal plane shutter consisting of two, closely parallel, apertured curtains, the respective apertures whereof constitute the exposure aperture of the shutter, take-up and tension rollers for said curtains respectively, means to release and means to rewind said curtains, and means to change the size of the said exposure aperture prior to shutter release, said rewinding means and said aperture-size-changing means including a rewind gear for the first curtain, a rewind gear for the second curtain, a rotatable shutter setting knob, said two rewind gears and said knob being co-axially mounted, one of said rewind gears having two pin-like formations laterally extending from opposite faces thereof, a main shutter rewind gear having associated means to engage in a driving relation one of said pin-like formations of such rewind gear, the other of said rewind gears having a series of circumferentially arranged openings therein, the said shutter setting knob having two pin-like formations extending from the inner face thereof, one of said formations being adapted to engage any one of said circumferential openings and the other of said formations being adapted to engage in a driving relation the other of said pin-like formations of the rewind gear provided therewith.

14. In a shutter movement for photographic cameras, a focal plane shutter consisting of two, closely parallel, apertured curtains, the respective apertures whereof constitute the exposure aperture of the shutter, take-up and tension rollers for said curtains respectively, means to release and means to rewind said curtains, and means to change the size of the said exposure aperture prior to shutter release, said rewinding means and said aperture-size-changing means including a rewind gear for the first curtain, a rewind gear for the second curtain, said rewind gears being co-axially mounted and in meshing relation respectively with regard to the take-up rollers for the two curtains, a latch plate fast with the second curtain rewind gear and having an arcuate cut-out portion and a shutter setting knob co-axial with said rewind gears, said knob and said rewind gear for the second curtain having co-acting formations to hold said knob with respect to said rewind gear for the second curtain, the rewind gear for the first curtain and the shutter setting knob having respectively lateral projections extending into said cut-out portion of the latch plate and adapted laterally to engage each other in a holding relation in said cut-out portion, and having a dog-like radial projection, and a shutter release lever with which said radial projection is engageable to prevent movement of said second curtain rewind gear until said shutter release lever is disengaged from said radial projection.

15. In a shutter movement for photographic cameras, a focal plane shutter consisting of two, closely parallel, apertured curtains, the respective apertures whereof constitute the exposure aperture of the shutter, take-up and tension rollers for said curtains respectively, means to release and means to rewind said curtains, and means to change the size of the said exposure aperture prior to shutter release, said rewinding means and said aperture-size-changing means including a rewind gear for the first curtain, a rewind gear for the second curtain, said two gears being co-axially mounted, a rotatable shutter setting knob also co-axially mounted with said two rewind gears, the first curtain rewind gear having two pin-like formations laterally extending from opposite faces thereof, a main shutter rewind gear having associated means to engage in a driving relation one of said pin-like formations of said first curtain rewind gear, the second curtain rewind gear having a series of circumferentially arranged openings therein, the said shutter setting knob having two pin-like formations extending from the inner face thereof, one of said formations being adapted to engage any one of said circumferential openings and the other of said formations being adapted to engage in a driving relation one of the pin-like formations of the first curtain rewind gear.

16. A construction in accordance with claim 1, but wherein the first curtain rewind gear 314 is provided with a second pin 327 on its face opposite to that carrying the drive pin 326, and wherein the said latch plate 319 is provided with a segmental cut-out part 328, and wherein the said second curtain rewind gear 316 is provided with a segmental opening 329 in alignment with said segmental cut-out part 328, and wherein the said shutter setting knob 321 has a pin 330 extending through the said segmental opening 329 in said rewind gear 316 into the said cut-out part 328 of the said latch plate 319, so that said pins 327 and 330 may laterally engage each other in the said cut-out part 328 and said segmental opening 329, and wherein the said latch plate 319 has a dog 333, and wherein the said rewind gears 314 and 316 and the said latch plate 319 are co-axially mounted, and wherein there is a shutter release lever 250, and wherein there is means to move said shutter release lever 250 to permit turning movement of the latch plate 319.

17. In a shutter movement for photographic cameras, a focal plane shutter consisting of two, closely parallel, apertured curtains, the respective apertures whereof constitute the exposure aperture of the shutter, take-up and tension rollers for said curtains respectively, said take-up rollers having rewinding shafts with pinions thereon, means to release and means to rewind said curtains, said rewinding means including a first curtain rewind gear with means to rotate the same, a second curtain rewind gear, said rewind gears being co-axially mounted and respectively meshing with said pinions on the rewinding shafts of the first curtain and the second curtain, said first and second curtain rewind gears having mutually co-acting, laterally extending, formations engageable with each other and which are circumferentially spaced to effect partial winding movement of the first curtain before winding movement of the second curtain is begun, thereby capping the two curtains, and thereupon to effect the continued winding of the two curtains in a self-capping relation until rewound and manually-operable, exposure-slot width-adjusting means for varying and predetermining the width of the exposure slot or aperture before the release of the shutter for exposure, said adjusting means including a shutter setting knob co-axial with and manually turnable with respect to said second curtain rewind gear, said shutter setting knob having two laterally-extending pins, one of which is engageable in a driving relation with said first curtain rewind gear, and the second curtain rewind gear having a circumferentially arranged series of holes with any of which the other pin of said knob is engageable.

18. In a shutter movement for photographic cameras, a focal plane shutter consisting of two closely-parallel apertured curtains, the respective apertures whereof constitute the exposure aperture of the shutter, take-up and tension rollers for said curtains respectively, said take-up rollers having rewinding shafts with pinions thereon, first curtain and second curtain rewind gears respectively meshing with the pinions on the said rewinding shafts of the first curtain and second curtain, a rotatable shutter setting knob co-axially and loosely mounted with respect to said curtain rewind gears, one of said curtain rewind gears having two pin-like formations laterally extending from opposite faces thereof, a main shutter rewind gear in driving relation with said first curtain and second curtain rewind gears respectively, and having cooperatingly associated means to engage, in a driving relation, one of said pin-like formations of such last mentioned rewind gear, the other of said curtain rewind gears having a series of circumferentially arranged openings therein, the said shutter setting knob having two pin-like formations extending from the inner face thereof, one of said formations of said shutter setting knob being adapted to engage any one of said circumferential openings of said other rewind gear and the other of said formations of the shutter setting knob being adapted to engage in a driving relation the other of said pin-like formations laterally extending from the said one of the rewind gears.

19. In a shutter movement for photographic cameras, a focal plane shutter consisting of two closely-parallel apertured curtains, the respective apertures whereof constitute the exposure aperture of the shutter, take-up and tension rollers for said curtains respectively, said take-up rollers having rewinding shafts with pinions thereon, first curtain and second curtain rewind gears respectively meshing with the pinions on the said rewinding shafts of the first curtain and second curtain, a rotatable shutter setting knob co-axially and loosely mounted with respect to said curtain rewind gears, one of said curtain rewind gears having two pin-like formations laterally extending from opposite faces thereof, a main shutter rewind gear in driving relation with said first curtain and second curtain rewind gears respectively and having cooperatingly associated means to engage in a driving relation one of said pin-like formations of such last mentioned rewind gear, the other of said curtain rewind gears having a series of circumferentially arranged openings therein and also having a cut-out part, the said shutter setting knob having two pin-like formations extending from the inner face thereof, one of said formations of said shutter setting knob being adapted to engage any one of said circumferential openings of said other rewind gear and the other of said formations of the shutter setting knob being adapted to engage in a driving relation the other of said pin-like formations laterally extending from the said one of the rewind gears.

20. In a shutter movement for photographic cameras, a focal plane shutter consisting of two closely-parallel apertured curtains, the respective apertures whereof constitute the exposure aperture of the shutter, take-up and tension rollers for said curtains respectively, said take-up rollers having rewinding shafts with pinions thereon, first curtain and second curtain rewind gears respectively meshing with the pinions on the said rewinding shafts of the first curtain and second curtain, a rotatable shutter setting knob co-axially and loosely mounted with respect to at least one of said curtain rewind gears, the first curtain rewind gear having two pin-like formations laterally extending from opposite faces thereof, a main shutter rewind gear in driving relation with said first and second curtain rewind gears respectively and having cooperatingly associated means to engage in a driving relation one of said pin-like formations of said first curtain rewind gear, the second curtain rewind gear having a series of circumferentially arranged openings therein, the said shutter setting knob having two pin-like formations extending from the inner face thereof, one of said formations of said shutter setting knob being adapted to engage any one of said circumferential openings of said second curtain rewind gear and the other of said formations of the shutter setting knob being adapted to engage in a driving relation one of the pin-like formations laterally extending from the said first curtain rewind gear.

EDSON S. HINELINE.

REFERENCES CITED

The following references are of record in the file of this patent:

UNITED STATES PATENTS

| Number | Name | Date |
| --- | --- | --- |
| 704,755 | Orth | July 15, 1902 |
| 709,079 | Donitz | Sept. 16, 1902 |
| 1,077,157 | Pickard | Oct. 28, 1913 |
| 1,204,154 | Hora | Nov. 27, 1916 |
| 2,122,671 | Leitz et al. | July 5, 1938 |
| 2,136,148 | Nuchterlein | Nov. 8, 1938 |
| 2,184,016 | Mihalyi | Dec. 19, 1939 |
| 2,186,614 | Mihalyi | Jan. 9, 1940 |
| 2,218,248 | Mihalyi | Oct. 15, 1940 |
| 2,242,124 | Hineline | May 13, 1941 |
| 2,253,084 | Mihalyi | Aug. 19, 1941 |
| 2,257,012 | Hineline | Sept. 23, 1941 |
| 2,350,026 | Fuerst | May 30, 1944 |